(12) United States Patent
Kim

(10) Patent No.: US 11,309,608 B2
(45) Date of Patent: Apr. 19, 2022

(54) BATTERY CASE AND BATTERY COOLING SYSTEM

(71) Applicant: KOREA INSTITUTE OF MACHINERY & MATERIALS, Daejeon (KR)

(72) Inventor: Sang Woo Kim, Changwon-si (KR)

(73) Assignee: KOREA INSTITUTE OF MATERIALS SCIENCE, Changwon-si (KR)

( * ) Notice: Subject to any disclaimer, the term of this patent is extended or adjusted under 35 U.S.C. 154(b) by 71 days.

(21) Appl. No.: 17/027,947

(22) Filed: Sep. 22, 2020

(65) Prior Publication Data
US 2021/0098758 A1 Apr. 1, 2021

(30) Foreign Application Priority Data
Sep. 30, 2019 (KR) .......... 10-2019-0120986

(51) Int. Cl.
| | |
|---|---|
| H01M 10/613 | (2014.01) |
| H01M 10/6567 | (2014.01) |
| H01M 10/6561 | (2014.01) |
| H01M 10/625 | (2014.01) |
| H01M 50/20 | (2021.01) |
| H01M 50/233 | (2021.01) |
| H01M 50/463 | (2021.01) |

(52) U.S. Cl.
CPC ......... *H01M 50/20* (2021.01); *H01M 10/613* (2015.04); *H01M 10/625* (2015.04); *H01M 10/6561* (2015.04); *H01M 10/6567* (2015.04); *H01M 50/463* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 2011/0183177 A1* | 7/2011 | Sohn ................. | H01M 10/653 429/120 |
| 2013/0017422 A1* | 1/2013 | Bae .................... | H01M 50/20 429/82 |
| 2020/0161881 A1* | 5/2020 | Ahmed .............. | H01M 10/613 |

FOREIGN PATENT DOCUMENTS

| | | |
|---|---|---|
| KR | 10-2011-0087561 | 8/2011 |
| KR | 10-2013-0008298 | 1/2013 |
| KR | 10-1487891 | 2/2015 |
| KR | 10-2015-0024999 | 3/2015 |
| KR | 10-2017-0139245 | 12/2017 |

OTHER PUBLICATIONS

KIPO, Office Action of KR 10-2019-0120986 dated Jan. 19, 2021.

* cited by examiner

*Primary Examiner* — Lisa S Park
(74) *Attorney, Agent, or Firm* — Lex IP Meister, PLLC

(57) ABSTRACT

The present invention relates to a battery case and a battery cooling system. The battery case includes an outer case; an inner case spaced apart from the outer case; and an intermediate member in a separation space between the outer case and the inner case, wherein the intermediate member includes: a plurality of peak portions which protrudes upward in a shape corresponding to a shape of a plurality of lower pins; a plurality of valley portions which protrudes downward in a shape corresponding to a shape of a plurality of upper pins; and a connection portion disposed between the peak portion and the valley portion.

10 Claims, 14 Drawing Sheets

BATTERY CASE AND BATTERY COOLING SYSTEM

CROSS-REFERENCE TO RELATED APPLICATION(S)

This application claims the benefit of Korean Patent Application No. 10-2019-0120986, filed on Sep. 30, 2019, in the Korean Intellectual Property Office, the entire disclosure of which is incorporated herein by reference for all purposes.

BACKGROUND

1. Field

The following description relates to a battery case and a battery cooling system, and more particularly, to a battery case and a battery cooling system, which provide excellent heat dissipation performance and heat exchange performance by using a truss-shaped intermediate member molded with a plurality of pins, are structurally excellent in strength, durability, and resistance to thermal stress by thermal expansion and thermal contraction, and have a low space filling rate, which allows for excellent flow of fluid and a ultra-lightweight product.

2. Description of Related Art

Generally, a battery widely used today has problems, such as a decrease in internal battery capacity, a decrease in charging and discharging efficiencies, and a shortened lifespan, due to a sudden increase in the internal temperature during overcharge or overdischarge and even during the use.

In addition, when the internal temperature of the battery rises, a thermal expansion phenomenon occurs in which the volume of the battery or other components increases, so that an internal pressure of a battery case surrounding the battery is increased or the battery case swells or is damaged due to cracks on the surface thereof.

Furthermore, a large-capacity battery case used in vehicles, etc. must be structurally strong to withstand severe external impact or external force and the thermal expansion, so that a wall thereof is formed to be thick, which makes the battery case heavy. Such a heavy battery case has many problems, such as a significant decrease in fuel efficiency, in terms of fuel cost saving.

As suggested in Korean Patent Registration No. 10-1487891, a technique for manufacturing a truss structure made of a metal material, which is resistant to impact or external force and can be made ultra-lightweight due to a very low space-filling rate, has been developed.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present invention is intended to solve the conventional problems and to provide a battery case and a battery cooling system, in which an intermediate member in the form of a truss capable of increasing the heat exchange surface area and generating turbulence in a fluid is used to improve heat dissipation performance and heat exchange performance, a space filling rate of the truss is very low, which allows for an ultra-lightweight structure, the intermediate member is structurally strong and hence resistant to impact or external force and has excellent internal pressure resistance, it is possible that, with a plurality of pins, continuous molding is performed, which can reduce manufacturing cost, time, or expense, the use of a multi-layer structure facilitates manufacturing and installation, and thermal stress can be alleviated by actively responding to thermal expansion or thermal contraction, thereby greatly improving product durability. However, such an objective is exemplary, and the scope of the present invention is not limited thereto.

In one general aspect, there is provided a battery case including an outer case; an inner case spaced apart from the outer case; and an intermediate member in a separation space between the outer case and the inner case, wherein the intermediate member includes: a plurality of peak portions which protrudes upward in a shape corresponding to a shape of a plurality of lower pins as the plurality of lower pins rises so that at least one of the peak portions is in contact with and supports the outer case; a plurality of valley portions which protrudes downward in a shape corresponding to a shape of a plurality of upper pins as the plurality of upper pins descends so that at least one of the plurality of valley portions is in contact with and supports the inner case; and a connection portion which is stretched and deformed between the lower pin and the upper pin and disposed between the peak portion and the valley portion.

The outer case and the inner case may be polygonal box- or cylindrical shaped as a whole to entirely enclose and protect a battery or a battery module.

The peak portions of the intermediate member may include intermediate peak portions at least one of which has a first height smaller than a separation distance between the outer case and the inner case so as not to be in contact with the outer case so that deformation of the inner case is absorbed and turbulence can be formed in a fluid passing through the separation space, and the valley portions of the intermediate member may include intermediate valley portions at least one of which has a second height smaller than the separation distance between the outer case and the inner case so as not to be in contact with the inner case so that turbulence can be formed in the fluid passing through the separation space.

The intermediate member may be in a truss structure in which at least a part consists of straight rods connected to each other to form any one selected from among a triangle, a rectangle, a rhombus, and a polygon.

The intermediate member may include a first layer portion installed in the separation space between the outer case and the inner case and a second layer portion installed in the separation space between the outer case and the inner case and stacked atop the first layer portion.

A peak portion of the second layer portion may be installed in an inverted manner relative to a peak portion of the first layer portion so as to be facing, and in contact with, the peak portion of the first layer portion and support each other.

The first layer portion and the second layer portion may have higher portions and lower portions formed in an alternating fashion so that turbulence is formed in a fluid passing through the separation space, the higher portions of the second layer portion may be in contact with the lower portions of the first layer portion, and the lower portions of the second layer portion may be in contact with the higher portions of the first layer portion.

The intermediate member may further include a buffer bent portion that is formed by an upper inclined pin slantly cut at least in part, or a lower inclined pin slantly cut at least in part, and is formed on the peak portion or the valley portion to be bent at a first angle with respect to a vertical line so that deformation of the inner case is absorbed during thermal expansion or thermal contraction of the inner case.

The outer case or the inner case may have at least one vent formed to allow free air flow.

In another general aspect, there is provided a battery cooling system including the above-described battery case and a refrigerant supply device configured to supply a refrigerant into the battery case.

Other features and aspects will be apparent from the following detailed description, the drawings, and the claims.

Figure 1:
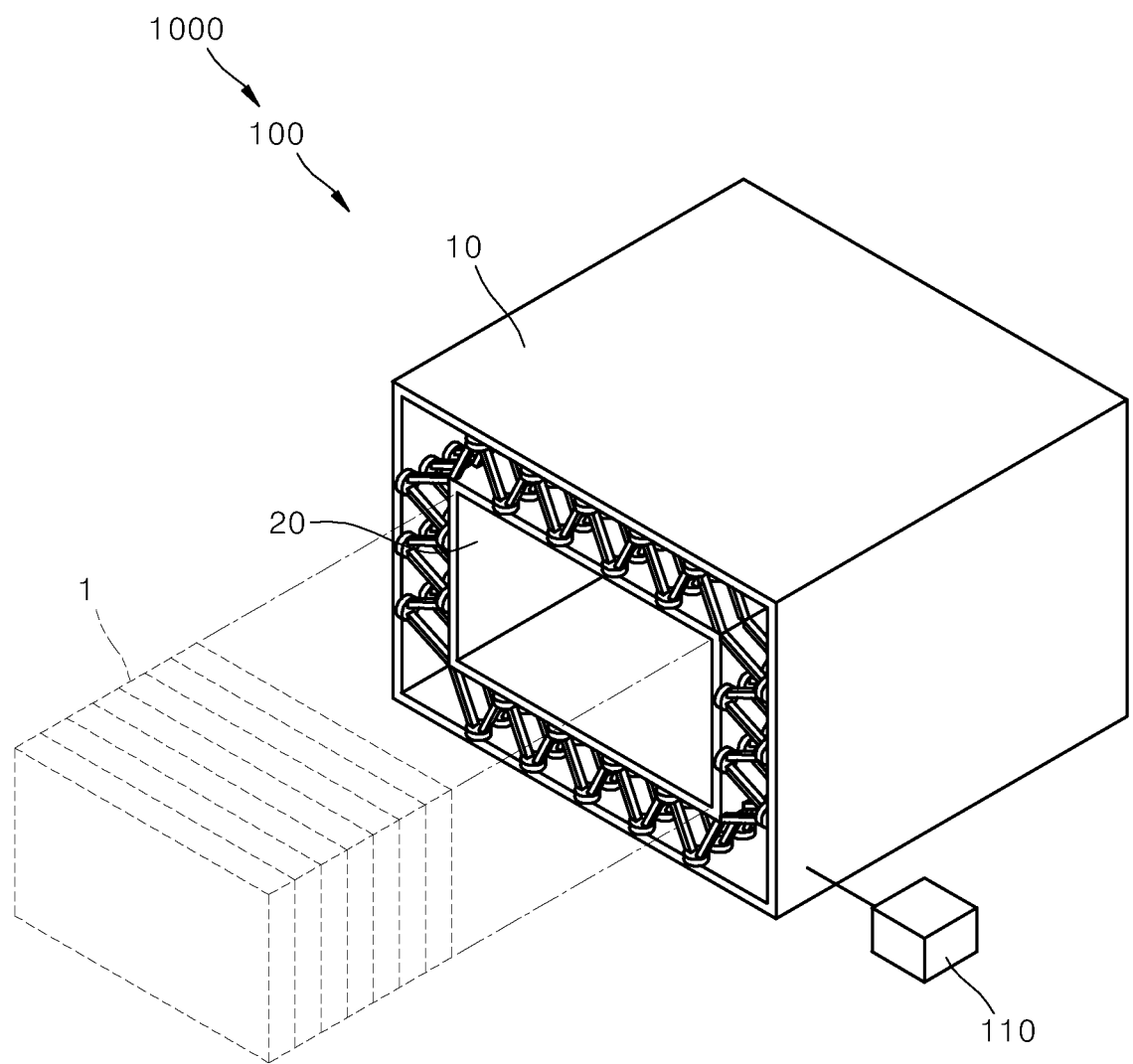
FIG. 1 is an exploded perspective view of a battery case and a battery cooling system according to some embodiments of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. Moreover, in the drawings, the dimensions of layers and regions may be exaggerated for clarity of illustration.

Figure 2:
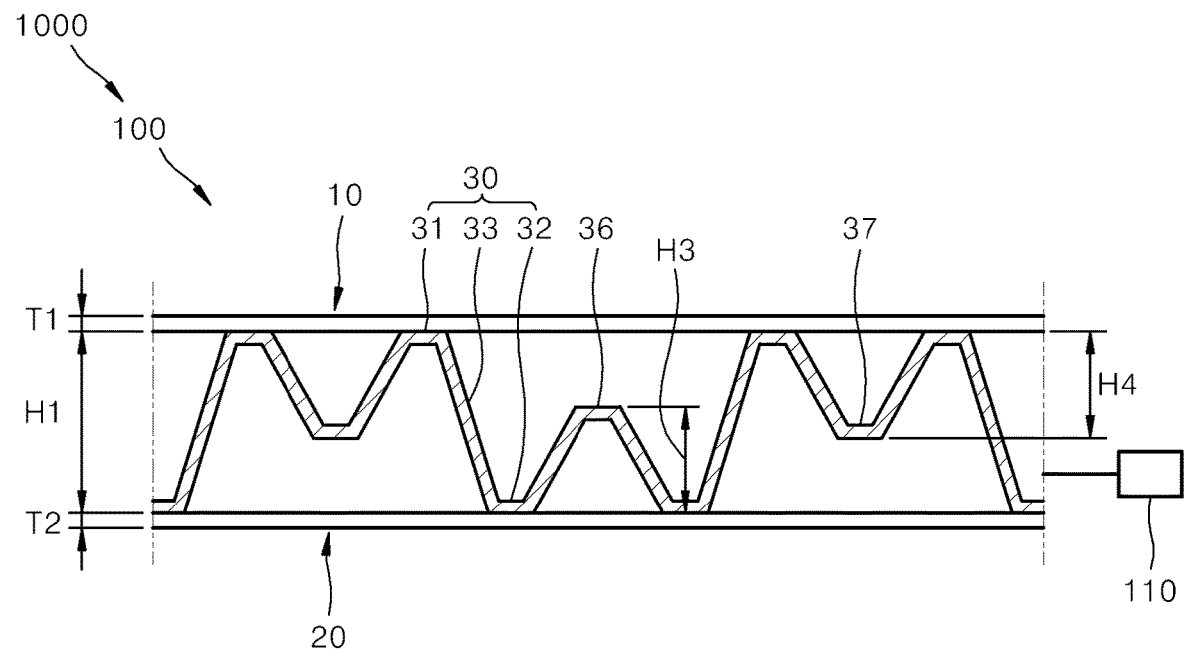
FIG. 2 is an enlarged cross-sectional view of a portion of the battery case of FIG. 1.

FIG. 1 is an exploded perspective view of a battery case 100 and a battery cooling system 1000 according to some embodiments of the present invention, and FIG. 2 is an enlarged cross-sectional view of a portion of the battery case of FIG. 1.

First, as shown in FIGS. 1 and 2, the battery case 100 according to some embodiments of the present invention may be a polygonal box or have a cylindrical shape as a whole to entirely enclose and protect a battery or a battery module 1, and may include an outer case 10 having a first thickness T1, an inner case 20 having a second thickness T2 and spaced apart from the outer case 10, and an intermediate member installed in a separation space A between the outer case 10 and the inner case 20.

Here, for example, the inner case 20 may be manufactured separately as illustrated, may be a surface layer of the battery or the battery module 1, or may be omitted.

Here, the intermediate member 30 may be a metal truss structure consisting, at least in part, of straight rods connected to each other.

The intermediate member 30 is sufficiently strong in durability and strength against impact or external force, and may be made of an elastic material to attenuate external impact or external force through elastic deformation.

However, the intermediate member 30 is not necessarily limited to a metal material, and any materials capable of press molding using a plurality of pins may be applied.

Therefore, the intermediate member 30 is capable of supporting the outer case 10 and the inner case 20 on both sides thereof, and the separation space A between the outer case 10 and the inner case 20 may be formed by the intermediate member 30.

Here, the intermediate member 30 may be bonded to each of the outer case 10 and the inner case 20 using various methods, such as vacuum brazing, cap brazing, a stainless film, a structural adhesive, welding, other laser bonding, ultrasonic bonding, and the like.

Therefore, since conventional heat dissipation pins including separate pins with complicated shapes are not used, it is possible to minimize a space filling rate and produce a ultra-lightweight battery case, which is structurally very robust, and sufficient strength and durability may be achieved at a relatively low cost through continuous process.

Figure 3:
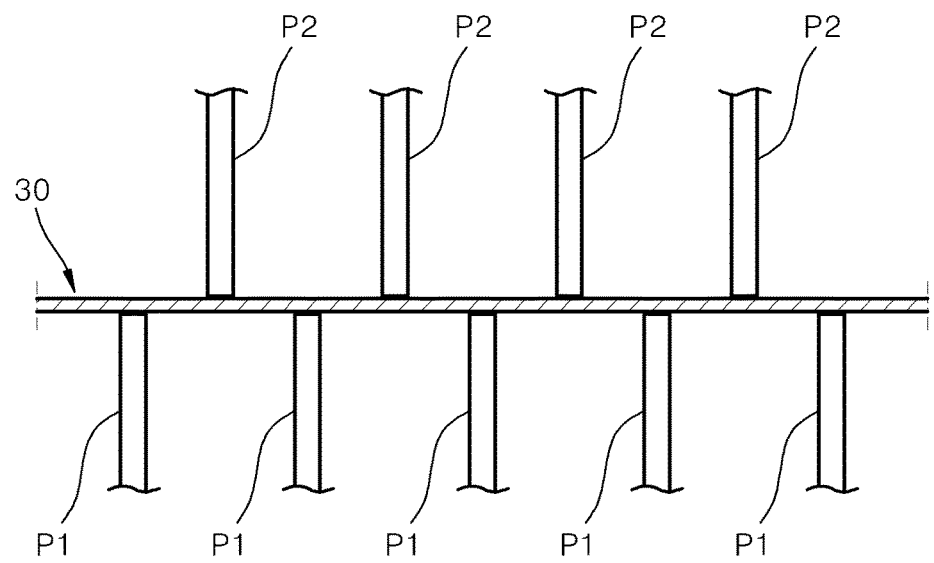
FIGS. 3 and 4 are views showing stages of a process of manufacturing an intermediate member of the battery case of FIG. 1.
Figure 4:
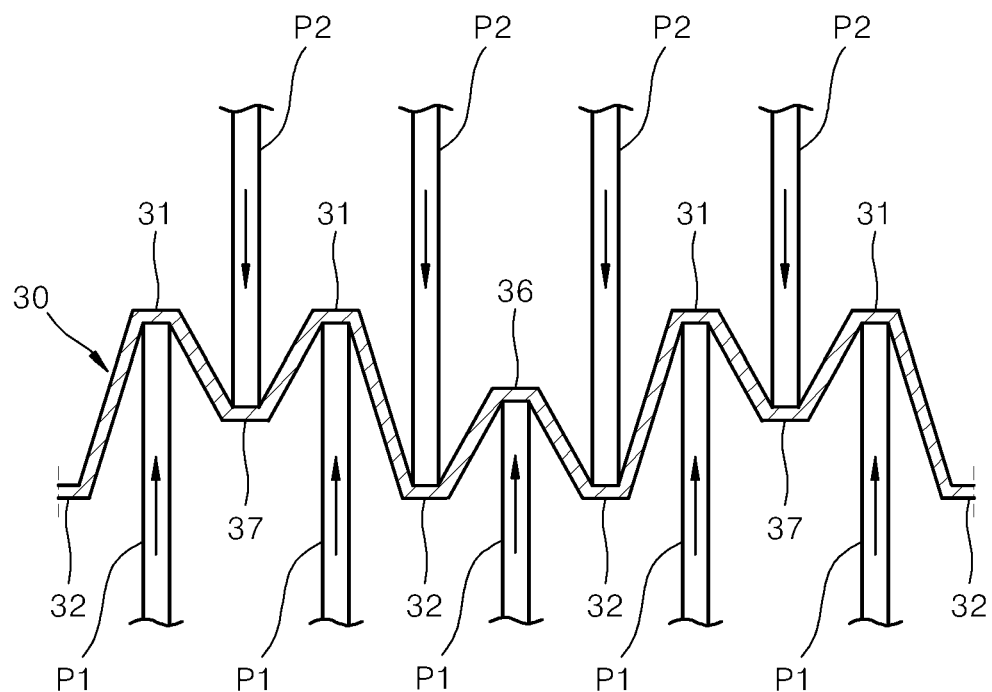

FIGS. 3 and 4 are views showing stages of a process of manufacturing the intermediate member 30 of the battery case 100 of FIG. 1.

As shown in FIGS. 3 and 4, the intermediate member 30 may include a plurality of peak portions 31, a plurality of valley portions 32, and connection portions 33, wherein the plurality of peak portions protrudes upward in a shape corresponding to a shape of a plurality of lower pins P1 as the plurality of lower pins rises so that at least one of the peak portions 31 is in contact with and supports the outer case 10, the plurality of valley portions 32 protrudes downward in a shape corresponding to a shape of a plurality of upper pins P2 as the plurality of upper pins descends so that at least one of the plurality of valley portions 32 is in contact with and supports the inner case 20, and each connection portion 33 is stretched and deformed between the lower pin P1 and the upper pin P2 so as to be formed in a straight line between the peak portion 31 and the valley portion 32.

Therefore, when the intermediate member 30 in a flat shape as shown in FIG. 3 is lifted by the lower pins P1 and, at the same time, pressed down by the upper pins P2 as shown in FIG. 4, the peak portions 31, the valley portions 32, and the connection portions 33 may be formed.

Here, the peak portion 31 is a portion that is formed by contacting it directly with the lower pin P1 corresponding to a tip shape of the lower pin P1, the valley portion 32 is a portion that is formed by contacting it directly with the upper pin P2 corresponding to the shape of a tip shape of the upper pin P2, and the connecting portion 33 is a portion that is not in direct contact with the lower pin P1 and the upper pin P2 but is stretched and deformed to be elongated in a straight line as a distance between the lower pin P1 and the upper pin P2 increases.

However, the peak portion 31 and the valley portion 32 may be wide in a circular or polygonal shape to increase a contact area with the outer case 10 and the inner case 20 and thereby increase the adhesion and may be formed to be flat to face the outer case 10 and the inner case 20. However, the shapes of these portions are not necessarily limited to the drawings, and, for example, the peak portion 31 and the valley portion 32 may be pointed, or be in the form of points as the connection portion 22 is very short.

In addition, for example, as shown in FIGS. 1 to 4, the peak portions 31 of the intermediate member 30 may include intermediate peak portions 36 at least one of which has a first height H2 smaller than a separation distance H1 between the outer case 10 and the inner case 20 so as not to be in contact with the outer case 10 so that turbulence can be generated in a fluid passing through the separation space A, and the valley portions 32 of the intermediate member 30 may include intermediate valley portions 37 at least one of which has a second height H4 smaller than the separation distance H1 between the outer case 10 and the inner case 20 so as not to be in contact with the inner case 20 so that turbulence can be generated in the fluid passing through the separation space A.

Accordingly, the fluid, such as a heat exchange medium or a refrigerant, passing through the separation space A is blocked by the intermediate peak portions 36 and the intermediate valley portions 37 and collides with them, whereby turbulence, such as a vortex flow, may be generated. Such turbulence may promote convection, thereby increasing heat transfer. In addition, such a cross structure is strong against impact and external force in various directions, so that the shape can be more structurally securely maintained.

Therefore, it is possible to improve the performance of the product by using the shapes of the intermediate member 30 and to make the product highly value-added and utilize it for various purposes.

Figure 5:
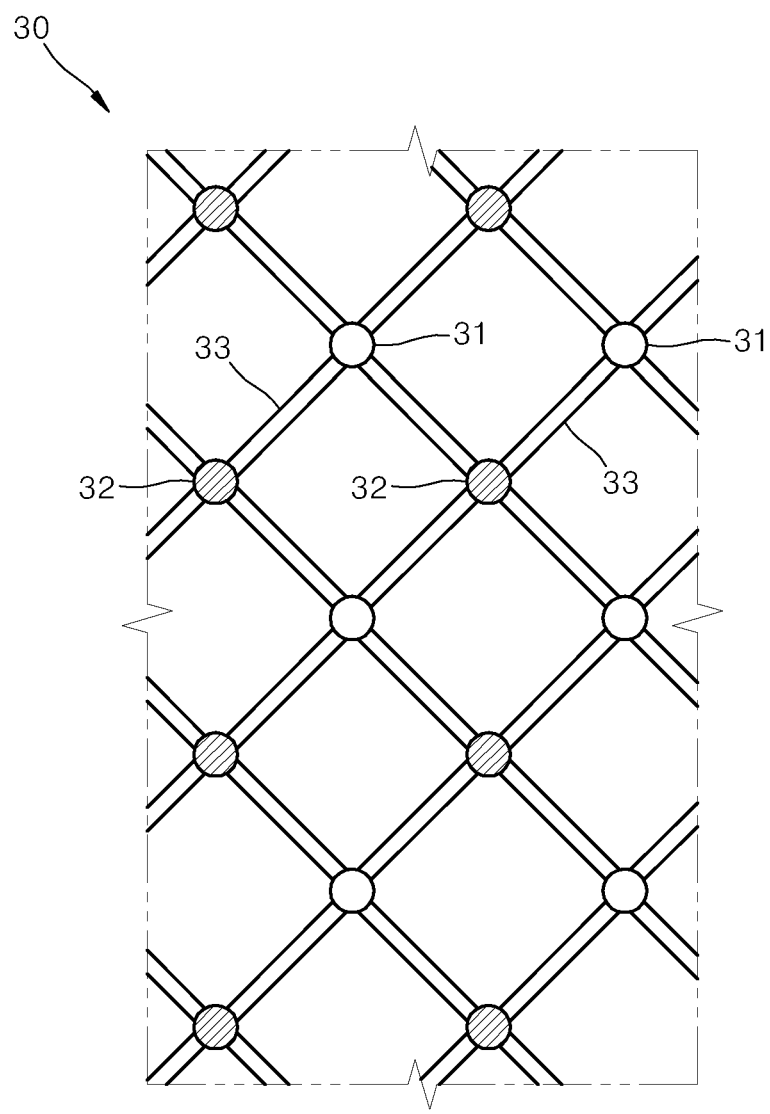
FIG. 5 is a plan view of an intermediate member of the battery case of FIG. 1.
Figure 6:
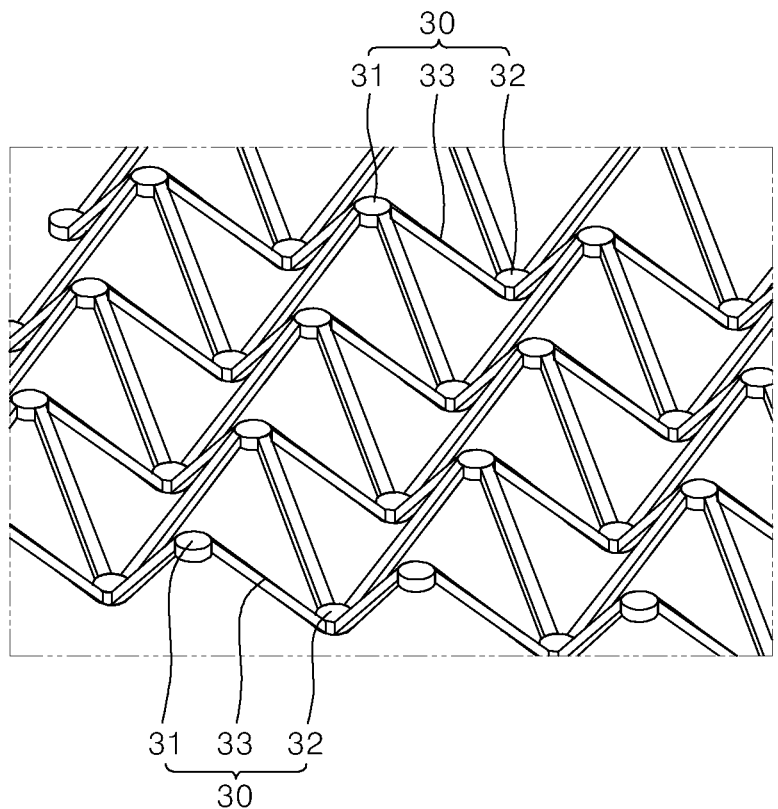
FIG. 6 is a perspective view of an intermediate member of the battery case of FIG. 1.
Figure 7:
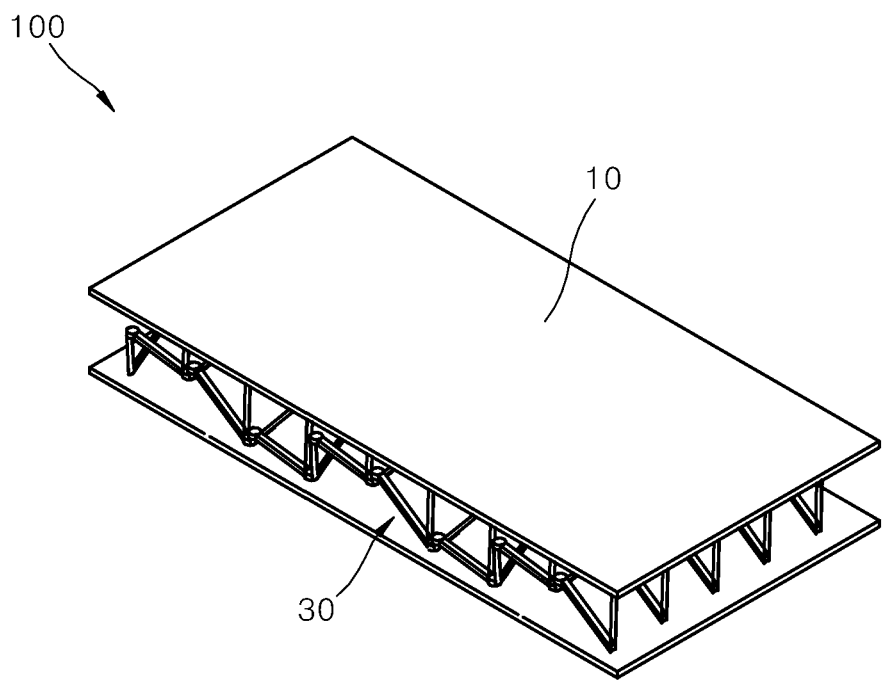
FIG. 7 is an exploded perspective view of the battery case of FIG. 1.

FIG. 5 is a plan view of the intermediate member 30 of the battery case 100 of FIG. 1, FIG. 6 is a perspective view of the intermediate member 30 of the battery case 100 of FIG. 1, and FIG. 7 is an exploded perspective view of the battery case 100 of FIG. 1.

As shown in FIGS. 5 to 7, the intermediate member 30 may be a truss structure in which at least a part consists of straight rods connected to each other to form any one selected from among a triangle, a rectangle, a rhombus, and a polygon.

Here, as shown in FIGS. 6 and 7, the intermediate member 30 may have various shapes according to the distance by which the above-described lower pins P1 and the upper pins P2 rise or descend.

However, the intermediate member 30 is not necessarily limited to the drawings, and may be a truss structure in which the straight rods are connected to each other to form any one selected from among a triangle, a rhombus, and a polygon, in addition to a rectangle.

Therefore, due to the characteristics of the truss structure, it is resistant to external impact, load, or external force and has excellent durability, which can significantly increase the lifespan of the product.

Figure 8:
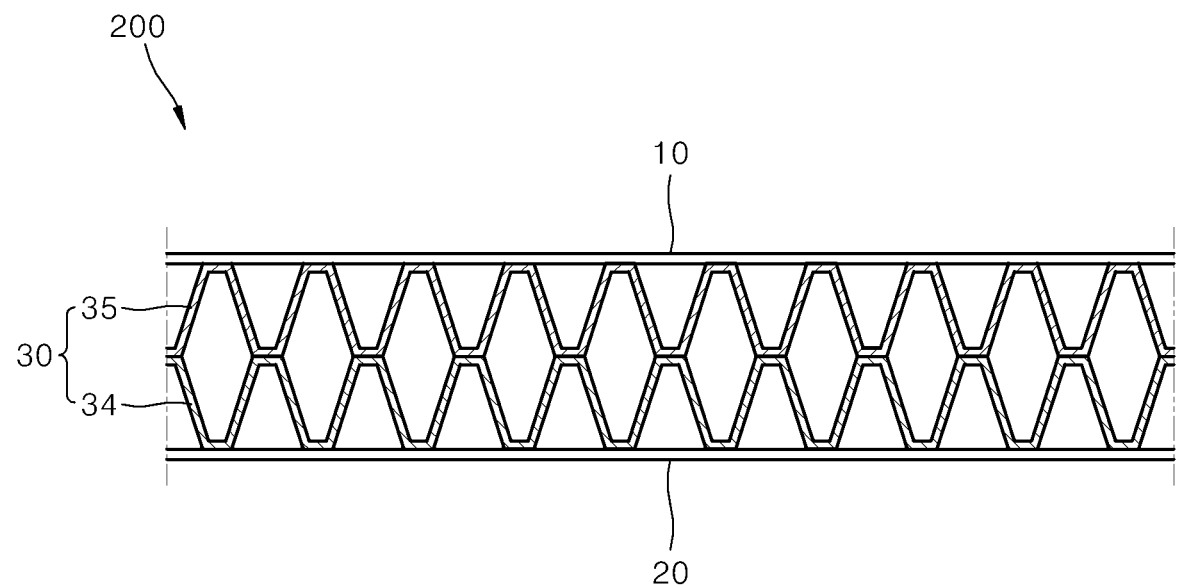
FIG. 8 is a cross-sectional view of a battery case according to some other embodiments of the present invention.
Figure 9:
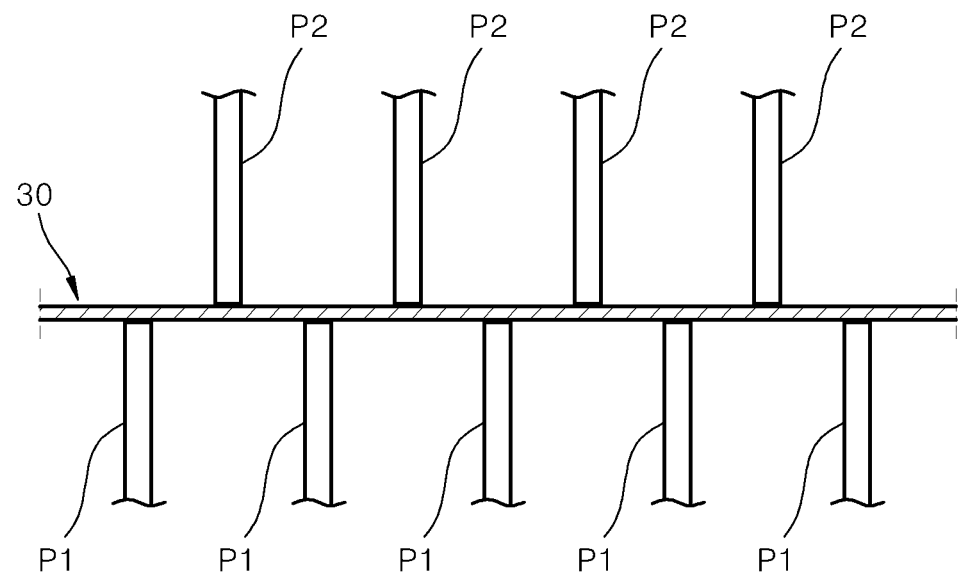
FIGS. 9 and 10 are views showing stages of a process of manufacturing an intermediate member of the battery case of FIG. 8.
Figure 10:
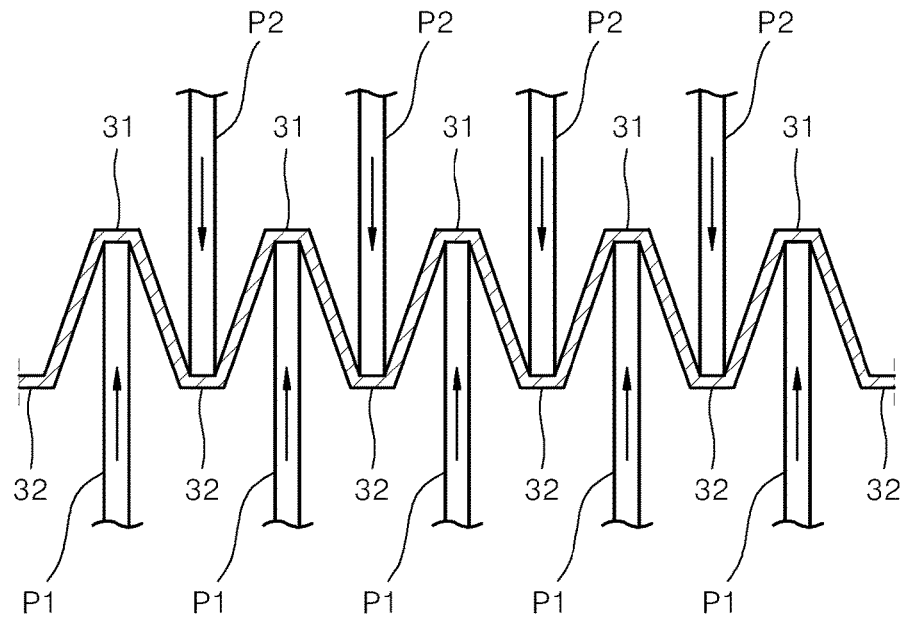

FIG. 8 is a cross-sectional view of a battery case 200 according to some other embodiments of the present invention, and FIGS. 9 and 10 are views showing stages of a process of manufacturing the intermediate member 30 of the battery case 200 of FIG. 8.

As shown in FIGS. 8 to 10, the intermediate member 30 of the battery case 200 according to some other embodiments of the present invention may include a first layer portion 34 disposed in the separation space A between the outer case 10 and the inner case 20 and a second layer portion 35 disposed in the separation space A between the outer case 10 and the inner case 20 and stacked atop the first layer portion 34.

That is, as shown in FIG. 8, the second layer portion 35 is stacked on the first layer portion 34 to make the internal structure denser in three dimensions or to create a wider thermal contact area.

In this case, peak portions 31 of the second layer portion 35 may be installed in an inverted manner relative to peak portions 31 of the first layer portion 34 so as to be facing, and in contact with, the peak portions 31 of the first layer portion 34 and support each other.

The first layer portion 34 and the second layer portion 35, like the outer case 10 and the inner case 20, may be bonded to each other by various methods, such as vacuum brazing, cap brazing, a stainless film, a structural adhesive, welding, other laser bonding, ultrasonic bonding, and the like.

Here, as shown in FIGS. 9 and 10, the shape of the intermediate member 30 may have various shapes according to the distance by which the above-described lower pins P1 and the upper pins P2 rise or descend.

However, the first layer portion 34 and the second layer portion 35 are not limited to the drawings, and, for example, the heights of the first layer portion 34 and the second layer portion 35 may be different from each other. When the heights or specifications of the first layer portion 34 and the second layer portion 35 are the same to each other, it may advantageous in terms of manufacturing parts, because manufacturing equipment of the same standard can be used.

Figure 11:
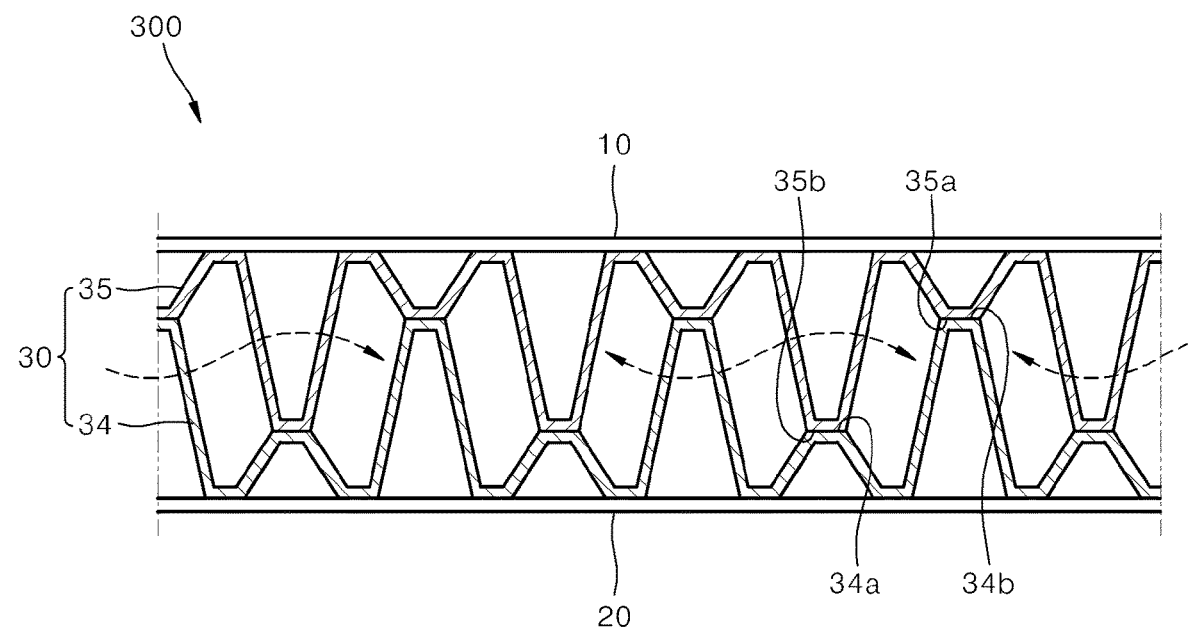
FIG. 11 is a cross-sectional view of a battery case according to still some other embodiments of the present invention.
Figure 12:
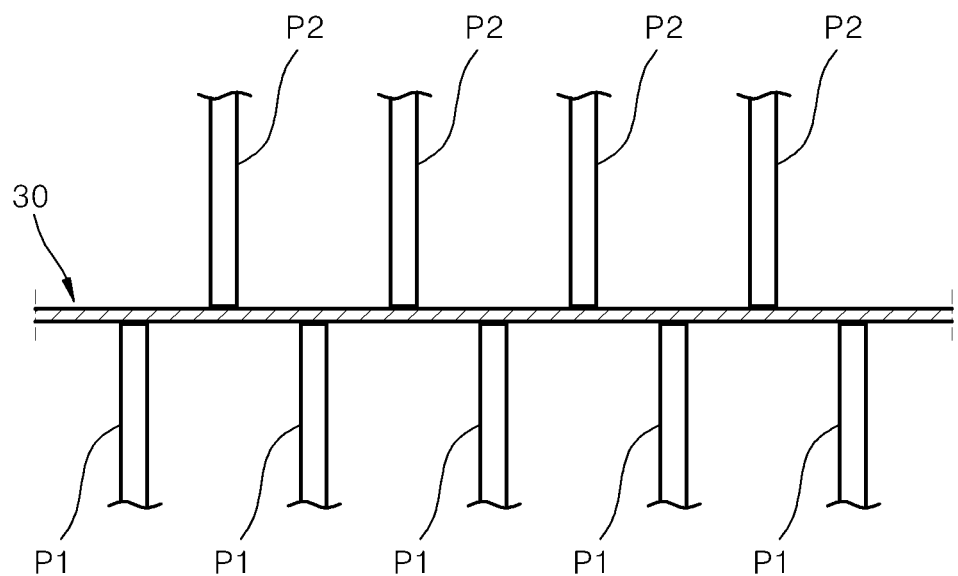
FIGS. 12 and 13 are views showing stages of a process of manufacturing an intermediate member of the battery case of FIG. 11.
Figure 13:
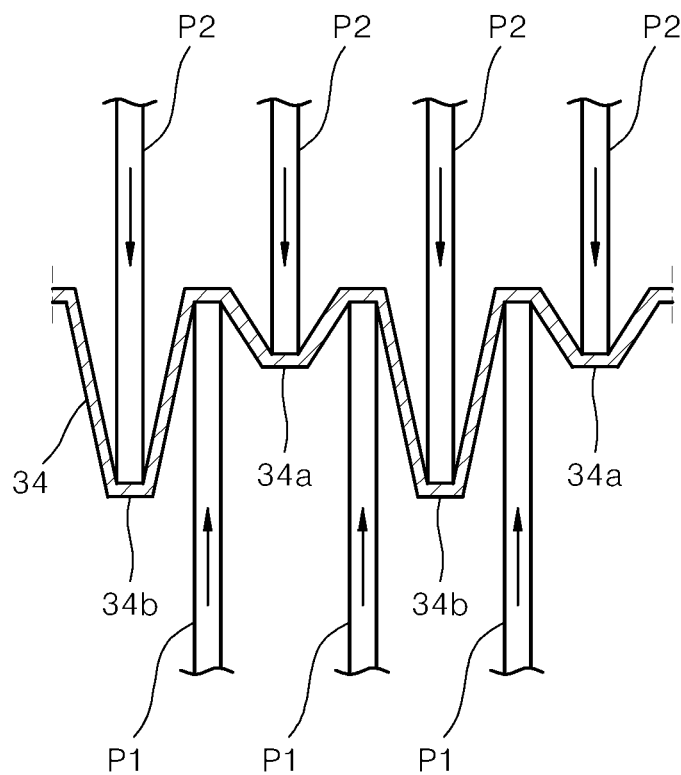

FIG. 11 is a cross-sectional view of a battery case 300 according to still some other embodiments of the present invention, and FIGS. 12 and 13 are views showing stages of a process of manufacturing the intermediate member 30 of the battery case 300 of FIG. 11.

As shown in FIGS. 11 to 13, the battery case 300 according to still some other exemplary embodiments of the present invention may include the first layer portion 34 and the second layer portion 35 that have higher portions and lower portions formed in an alternating fashion so that turbulence can be generated in the fluid passing through the separation space A, wherein the higher portions 35*b* of the second layer portion 35 may be in contact with the lower portions 34*a* of the first layer portion 34 and the lower portions 35*a* of the second layer portion 35 may be in contact with the higher portions 34*b* of the first layer portion 34.

Here, as illustrated in FIGS. 12 and 13, the intermediate member 30 may have various shapes according to a distance by which the above-described lower pins P1 and the upper pins P2 rise or descend.

Accordingly, the fluid, such as a heat exchange medium or a refrigerant, passing through the separation space A is blocked by the higher portions and the lower portions of each layer portion and collides with them, whereby turbulence, such as a vortex flow, may be generated. Such turbulence may promote convection, thereby increasing heat transfer. In addition, such a cross structure is strong against impact and external force in various directions, so that the shape can be more structurally securely maintained.

Therefore, it is possible to improve the performance of the product by using the shapes of the intermediate member 30 and to make the product highly value-added and utilize it for various purposes.

Meanwhile, as shown in FIGS. 1 and 2, the battery colling system 1000 according to some embodiments of the present invention may include any one of the battery cases 100, 200, and 300 described above, and a refrigerant supply device 110 that supplies a refrigerant into the battery case 100, 200, or 300. In this case, various circulating devices or replenishment devices may be used as the refrigerant supply device 100.

Accordingly, atmospheric air, nitrogen, air, a heat exchange medium, a refrigerant, and the like are additionally supplied to the above-described battery case 100, 200, or 300, thereby achieving high heat exchange performance along with mechanical and structural advantages.

FIGS. 14 to 18 are views showing another example of the intermediate member 30 of the battery case 100 of FIG. 1.

As shown in FIGS. 14 to 18, as another example of the intermediate member 30 of the battery case 100 of FIG. 1, the intermediate member 30 may further include a buffer bent portion E that is formed by a lower inclined pin P3 slantly cut at least in part, or an upper inclined pin P4 slantly cut at least in part, and is formed on the peak portion 31 or the valley portion 32 to be bent at a first angle K1 or a second angle K2 with respect to a vertical line.

Figure 14:
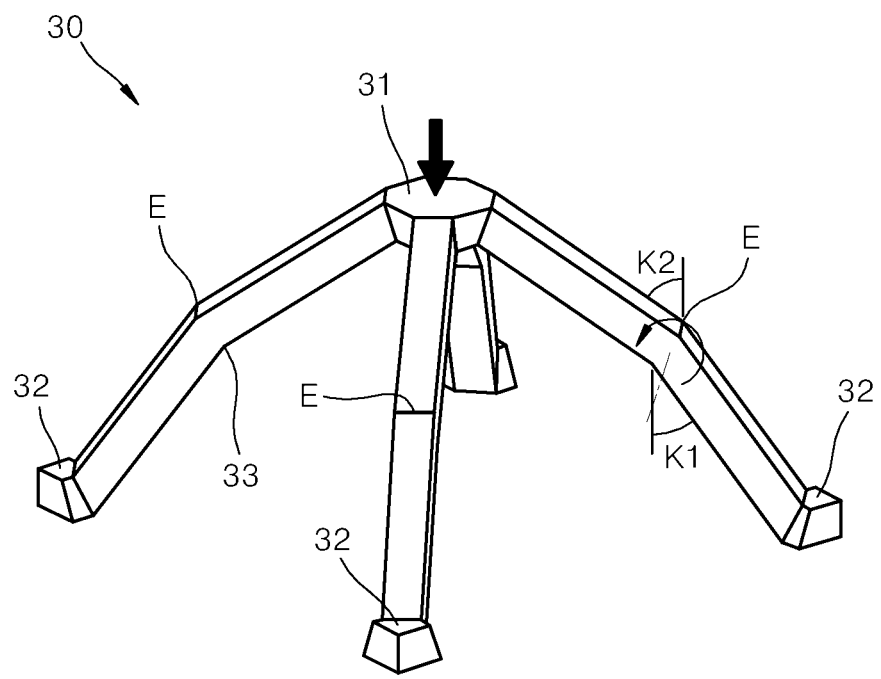
FIGS. 14 to 18 are views showing another example of the intermediate member of the battery case of FIG. 1.
Figure 15:
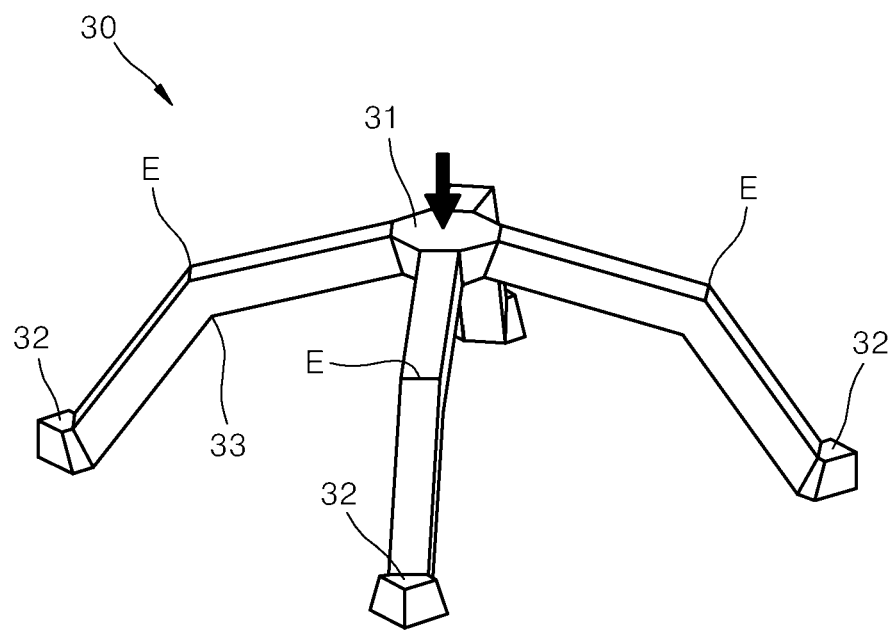
Figure 16:
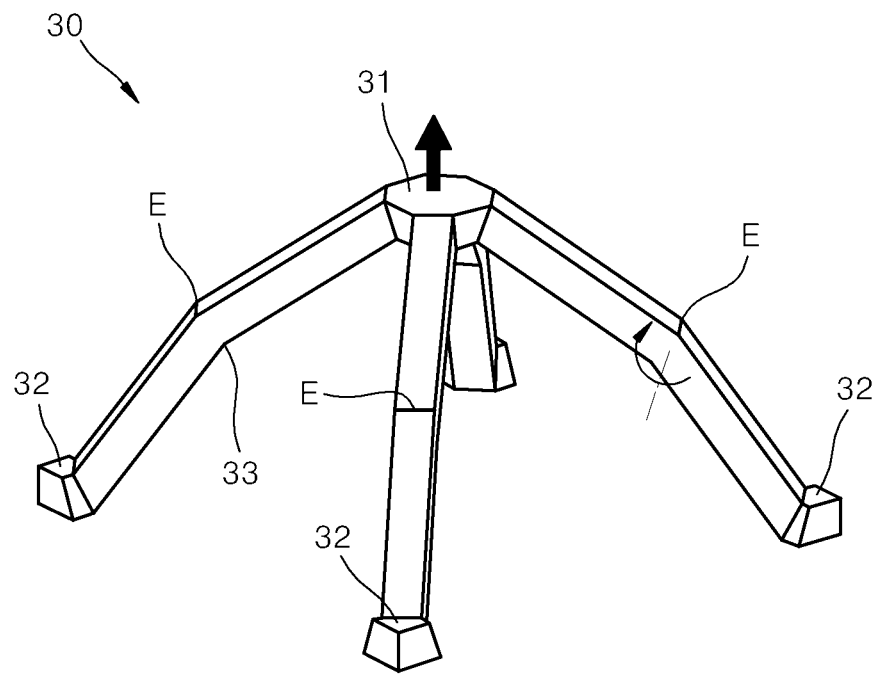

Accordingly, a stretched state may be maintained, as shown in FIG. 14, until impact or external force is applied, and when impact or external force is applied, the buffer bent portion E may elastically bend and thereby be compressed, as shown in FIG. 15. Then, when the impact or the external force is removed, the buffer bent portion E may be restored and thereby return to a stretched state, as shown in FIG. 16.

Therefore, when a compressive load acts within individual elastic ranges of unit cells of the battery or the battery module described above, the intermediate member 30 may be expanded or contracted by elastic restoration using the buffer bent portion E. The swelling phenomenon of the battery that repeats contraction and expansion during the repetition of charge and discharge may be controlled through an elastic design of the intermediate member 30 and a colling function may be performed by moving the fluid to the intermediate member 30.

Figure 17:
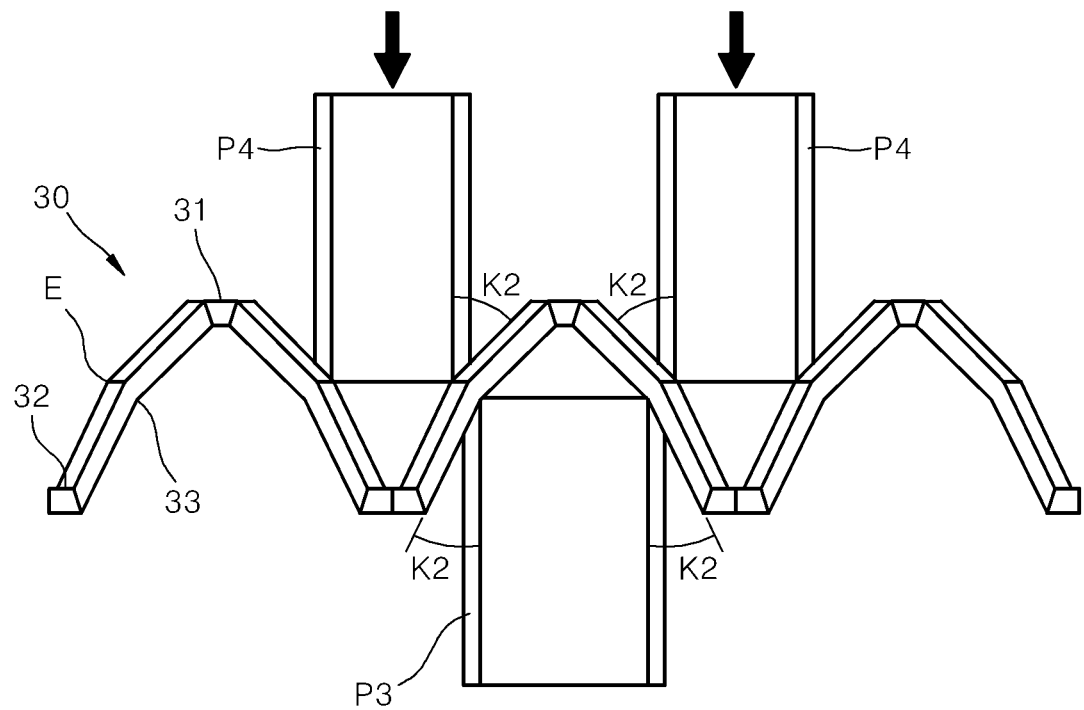
Figure 18:
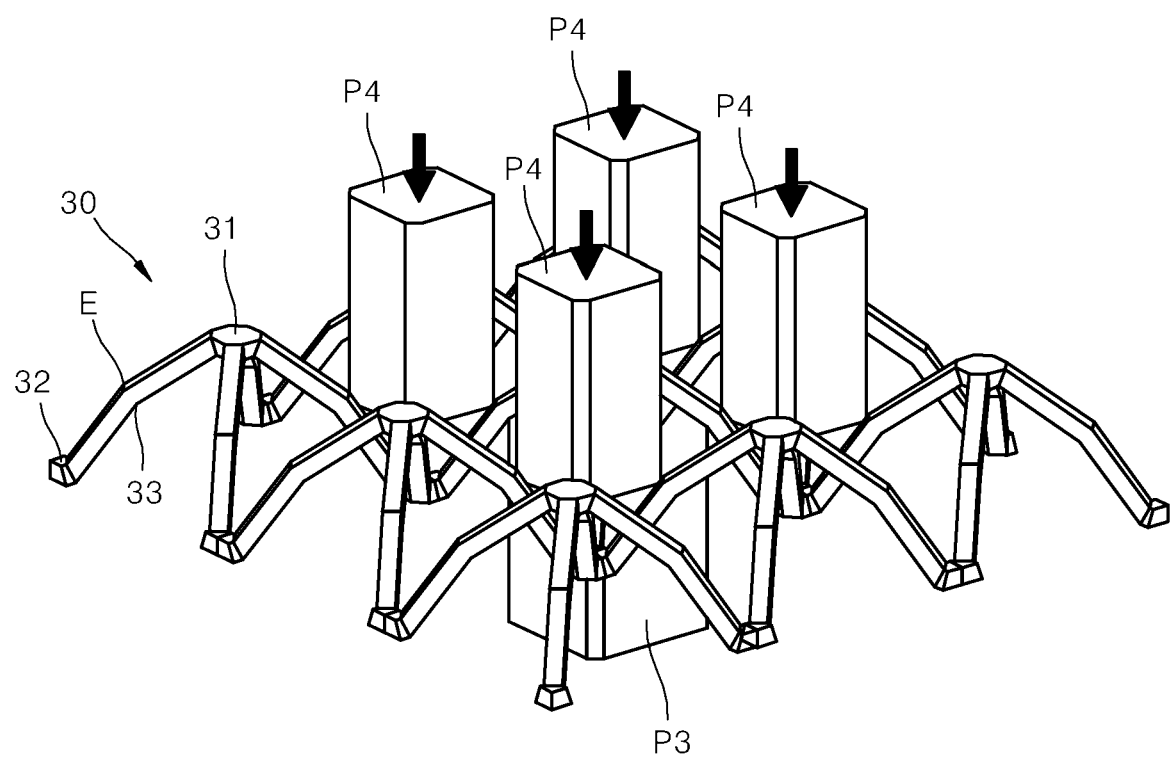

In this case, as shown in FIGS. 17 and 18, the buffer bent portion E may have various inclination angles and shapes according to shapes or sizes of tips of the lower inclined pins P3 and the upper inclined pins P4.

Figure 19A:
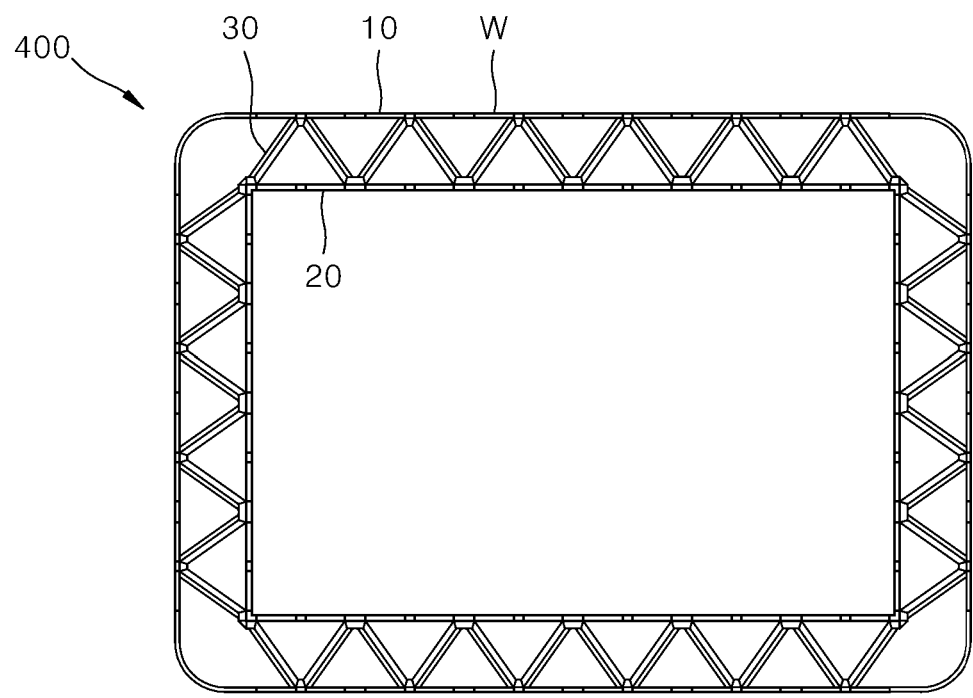
FIGS. 19A, 19B, 20, and 21 are views illustrating another example of an outer case and an inner case of a battery case according to still other embodiments of the present invention.
Figure 19B:
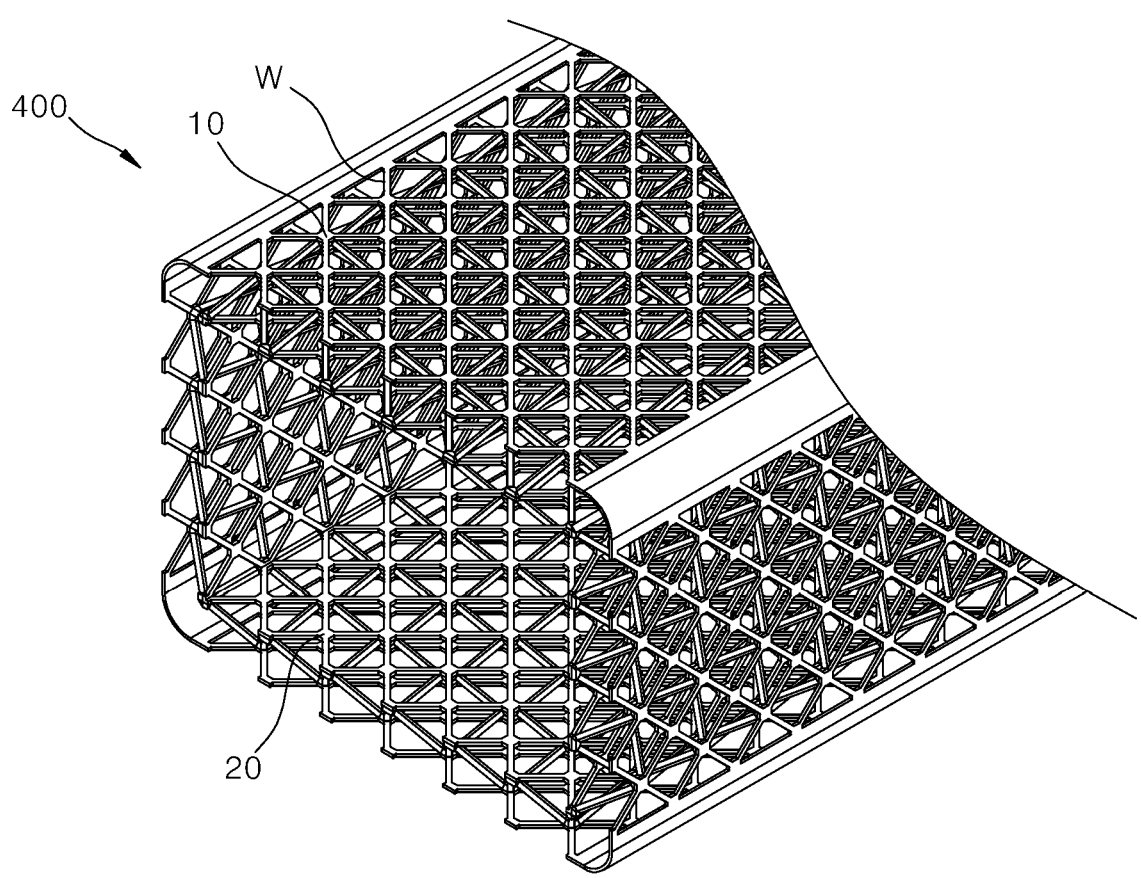

FIGS. 19A, 19B, 20 and 21 are views showing another example of an outer case and an inner case of a battery case 400 according to still other embodiments of the present invention. FIG. 19A is a front view of a battery case 400 according to still other embodiments of the present invention, and FIG. 19B is a perspective view of a battery case 400 according to still other embodiments of the present invention.

As shown in FIGS. 19A and 19B, an outer case 10 and an inner case 20 of the battery case 400 according to other embodiment of the present invention may have at least one vent W to allow free air flow.

Figure 20:
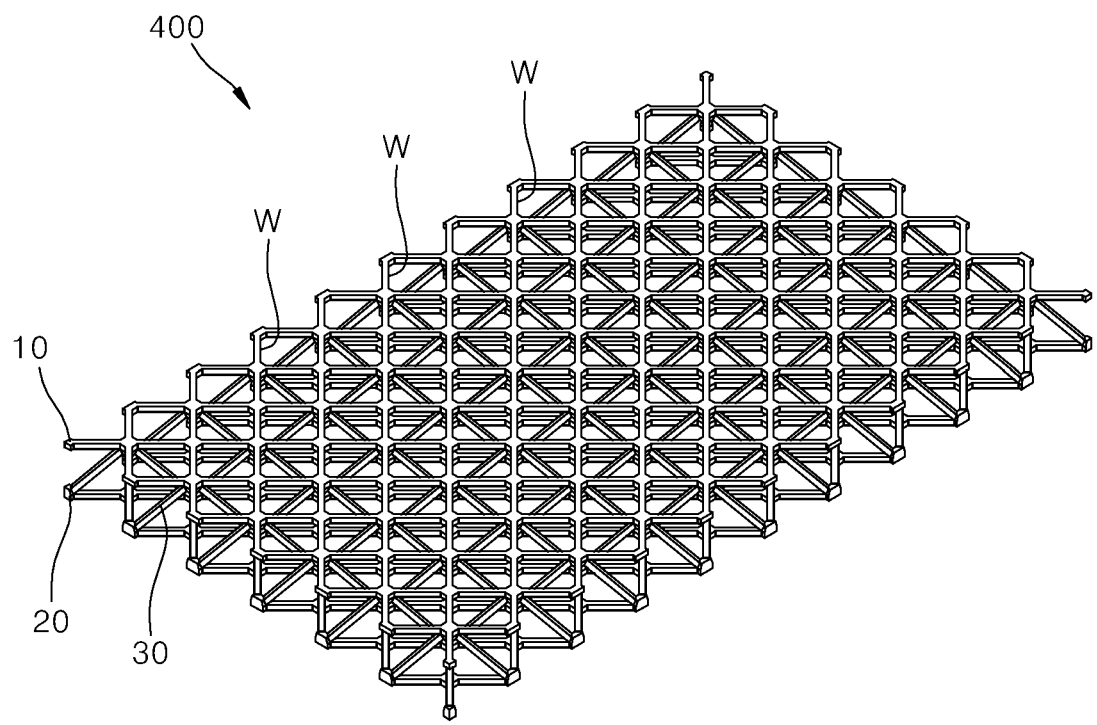
Figure 21:
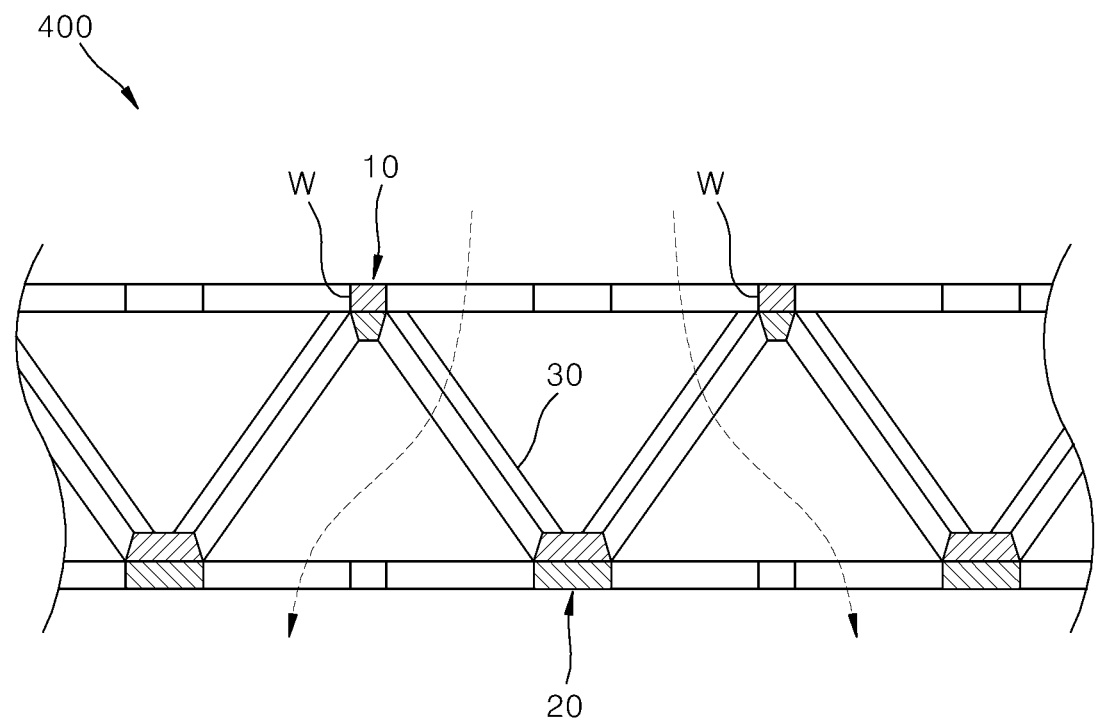

More specifically, for example, as shown in FIGS. 20 and 21, an intermediate member 30 is interposed between and adhered to the outer case 10 and the inner case 20 to form an integrated part, wherein a portion of the outer case 10 is adhered to a peak portion 31 of the intermediate member 30 and a valley portion 32 of the intermediate member 30 is adhered to the inner case 20, and the vent W may be formed in plural in a shape corresponding to the shape of the intermediate member 30 on unnecessary portions other than the portions that are adhered to the peak portion 31 and the valley portion 32.

Accordingly, as indicated by a dotted line in FIG. 21, fluid, such as air, is able to flow very easily between the vents W and the intermediate members 30 formed in the outer case 10 and the inner case 20, which maximizes heat dissipation performance and at the same time lowers the space filling rate, thereby making it possible to manufacture an ultra-lightweight product.

Therefore, as described above, the heat dissipation performance and the heat exchange performance can be improved by using the intermediate member 30 in the form of a truss capable of increasing the heat exchange surface area and generating turbulence in a fluid; the space filling rate of the truss is very low, which allows for an ultra-lightweight structure; the intermediate member is structurally strong and hence resistant to impact or external force and has excellent internal pressure resistance; extension for various uses is possible through horizontal arrangement of modular cooling pads; it is possible that, with a plurality of pins, continuous molding is performed, which can reduce manufacturing cost, time, or expense; the use of a multi-layer structure facilitates manufacturing and installation; and thermal stress can be alleviated by actively responding to thermal expansion or thermal contraction, thereby greatly improving product durability.

Meanwhile, the battery case according to various embodiments of the present invention, such as the outer case 10, the inner case 20, and the intermediate member 30 described above, may be manufactured integrally by using a metal 3D printing technology. When a 3D printer is used, very diverse and complex three-dimensional shapes may be realized. In addition, a wide variety of manufacturing devices, such as various bending machines, presses, molds, injection machines, and the like, may be applied.

As described above, according to various embodiments of the present invention, heat dissipation performance and heat exchange performance can be improved by using an intermediate member in the form of a truss capable of increasing the heat exchange surface area and generating turbulence in a fluid, the space filling rate of the truss is very low, which allows for an ultra-lightweight structure, the intermediate member is structurally strong and hence resistant to impact or external force and has excellent internal pressure resistance, it is possible that, with a plurality of pins, continuous molding is performed, which can reduce manufacturing cost, time, or expense, the use of a multi-layer structure facilitates manufacturing and installation, and thermal stress can be alleviated by actively responding to thermal expansion or thermal contraction, thereby greatly improving product durability. However, the scope of the present invention is not limited by these effects.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

REFERENCE NUMERALS

10: OUTER CASE
20: INNER CASE
30: INTERMEDIATE MEMBER
A: SEPARATION SPACE
31: PEAK PORTION
32: VALLEY PORTION
33: CONNECTION PORTION
P1: LOWER PIN
P2: UPPER PIN
34: FIRST LAYER PORTION
35: SECOND LAYER PORTION
36: INTERMEDIATE PEAK PORTION
37: INTERMEDIATE VALLEY PORTION
P3: LOWER INCLINED PIN
P4: UPPER INCLINED PIN
E: BUFFER BENT PORTION
W: VENT
100, 200, 300, 400: BATTERY CASE
110: REFRIGERANT SUPPLY DEVICE
1000: BATTERY COOLING SYSTEM

What is claimed is:

1. A battery case comprisng:
an outer case;
an inner case spaced apart from the outer case; and
an intermediate member in a separation space between the outer case and the inner case,
wherein the intermediate member includes
a plurality of peak portions which protrudes upward in a shape corresponding to a shape of a plurality of lower pins as the plurality of lower pins rises so that at least one of the peak portions is in contact with and supports the outer case,
a plurality of valley portions which protrudes downward in a shape corresponding to a shape of a plurality of upper pins as the plurality of upper pins descends so that at least one of the plurality of valley portions is in contact with and supports the inner case, and
a connection portion which is stretched and deformed between a lower pin of the plurality of lower pins and an upper pin of the plurality of upper pins and disposed between a peak portion of the plurality of peak portions and a valley portion of the plurality of valley portions.

2. The battery case of the claim 1, wherein the outer case and the inner case are polygonal box- or cylindrical shaped as a whole to entirely enclose and protect a battery or a battery module.

3. The battery case of claim 1, wherein the peak portions of the intermediate member include intermediate peak portions at least one of which has a first height smaller than a separation distance between the outer case and the inner case so as not to be in contact with the outer case so that deformation of the inner case is absorbed and turbulence can be formed in a fluid passing through the separation space and the valley portions of the intermediate member include intermediate valley portions at least one of which has a second height smaller than the separation distance between the outer case and the inner case so as not to be in contact with the inner case so that turbulence can be formed in the fluid passing through the separation space.

4. The battery case of claim 1, wherein the intermediate member is in a truss structure in which at least a part consists of straight rods connected to each other to form any one of a triangle, a rectangle, a rhombus, and a polygon.

5. The batter case of claim 1, wherein the intermediate member includes a first layer portion installed in the separation space between the outer case and the inner case and a second layer portion installed in the separation space between the outer case and the inner case and stacked atop the first layer portion.

6. The battery case of claim 5, wherein a peak portion of the second layer portion is installed in an inverted manner relative to a peak portion of the first layer portion so as to be facing, and in contact with, the peak portion of the first layer portion and support each other.

7. The battery case of claim 6, wherein the first layer portion and the second layer portion have higher portions and lower portions formed in an alternating fashion so that turbulence is formed in a fluid passing through the separation space, the higher portions of the second layer portion are in contact with the lower portions of the first layer portion, and the lower portions of the second layer portion are in contact with the higher portions of the first layer portion.

8. The battery case of claim 1, wherein the intermediate member further includes a buffer bent portion that is formed by an upper inclined pin slantly cut at least in part, or a lower inclined pin slantly cut at least in part, and is formed on the peak portion or the valley portion to be bent at a first angle with respect to a vertical line so that deformation of the inner case is absorbed during thermal expansion or thermal contraction of the inner case.

9. The battery case of claim 1, wherein the outer case or the inner case has at least one vent formed to allow free air flow.

10. A battery cooling system comprising:
the battery case of claim 1; and
a refrigerant supply device configured to supply a refrigerant into the battery case.

* * * * *